United States Patent [19]

Ridgway

[11] 4,024,114

[45] May 17, 1977

[54] COPOLYAMIDES DERIVED FROM CYCLOHEXANEBIS(ETHYLAMINE)

[75] Inventor: James S. Ridgway, Pensacola, Fla.

[73] Assignee: Monsanto Company, St. Louis, Mo.

[22] Filed: Sept. 15, 1971

[21] Appl. No.: 180,911

Related U.S. Application Data

[63] Continuation of Ser. No. 752,769, Aug. 15, 1968, abandoned.

[52] U.S. Cl. .................... 260/78 R; 260/47 CZ; 260/78 A; 260/78 L
[51] Int. Cl.$^2$ ........................................ C08G 69/28
[58] Field of Search ................................. 260/78 R

[56] References Cited

UNITED STATES PATENTS

| | | | |
|---|---|---|---|
| 2,324,936 | 7/1943 | Kroeper et al. | 260/78 R |
| 2,577,621 | 12/1951 | May et al. | 260/78 R |
| 3,012,994 | 12/1961 | Bell et al. | 260/78 R |
| 3,950,310 | 4/1976 | Bouboulis | 260/78 R |

FOREIGN PATENTS OR APPLICATIONS

| | | | |
|---|---|---|---|
| 924,240 | 2/1955 | Germany | 260/78 R |

*Primary Examiner*—Harold D. Anderson
*Attorney, Agent, or Firm*—John W. Whisler

[57] ABSTRACT

Polyamides derived from cyclohexanebis(ethylamine) provide a class of polyamides useful in fabricating shaped articles.

3 Claims, No Drawings

COPOLYAMIDES DERIVED FROM CYCLOHEXANEBIS(ETHYLAMINE)

This is a continuation of application Ser. No. 752,769 filed Aug. 15, 1968 and now abandoned.

BACKGROUND OF THE INVENTION

The present invention relates to fiber forming synthetic linear polyamides having exceptional dimensional stability comprising polyamides formed by condensation of amide-forming compounds, comprising cyclohexanebis(ethylamine)

Polyamides derived from cyclohexanebis (methylamine) are known in the prior art. In U.S. Pat. No. 3,012,994 polyamides derived from the condensation of 1,3- or 1,4-cyclohexanebis(methylamine) and a dicarboxylic acid are described. These polyamides possess good stability and strength properties and are described as having relatively high melting points; for example, the polyamide of trans-1, 4cyclohexane-bis(-methylamine) and adipic acid has a crystalline melting point of 345° C., whereas nylon 66 formed from hexamethylene diamine and adipic acid has a melting point of only 264° C. However, the high melting point advantage of these polyamides also gives rise to certain inherent disadvantages. For example, polyamides having crystalline melting points much above about 300° C. tend to decompose into degradation products prior to melting. As a result filaments formed from these high melting polyamides generally have poor processability and inferior properties. Although lower melting polyamides can be obtained with trans-1,4cyclohexanebis(-methylamine) by condensation with longer chain carboxylic acids, the use of the longer chain acids results in a decrease in the dimensional stability of the resulting polyamide. An object of the present invention is to provide polyamides derived from components comprising a cyclohexanebis(alkylamine) which have good dimensional stability and which have substantially lower melting points than the corresponding polyamides derived from cyclohexanebis(methylamine).

SUMMARY OF THE INVENTION

The above and other objects of the invention are accomplished by providing polyamides derived from cyclohexanebis(ethylamine). The present invention therefore relates to a novel class of polyamides having exceptional stability of modulus to heat and moisture, i.e. dimensional stability, derived from amide-forming compounds, at least one of which is cyclohexanebis(ethylamine). Particularly useful polymides of this class are those prepared from trans-1, 4cyclohexanebis(ethylamine) and unbranched saturated aliphatic dicarboxylic acids. In general, polyamides of the invention can be shaped into fibers by utilizing conventional melt spinning techniques.

The melting point values of the polyamides of the present invention are wholly unexpected in view of the teachings in the prior art. For example, in the Journal of Polymer Science Part A, General papers, Volume 3, pages 19–30 (1965). Bell, Smith and Kibler report the melting points of polyamides derived from trans-1,4-cyclohexanebis(methylamine) and compare them to the melting points of the corresponding polyamides derived from p-xylene-$\alpha,\alpha'$-diamine. Also in the Journal of Polymer Science Part A-b General papers Volume 4, pages 1463–1473 (1966). Saotome and Komoto report the melting points of polyamides derived from p-xylene-$\alpha,\alpha'$-diamine and compare them to the melting points of the corresponding polyamides derived from 2.2'-p-phenylenebis (ethylamine). The discoveries of Bell et al and Saotome et al may be summarized in the following diagram, wherein polyamides (I), (II) and (III) are formed from a $HOOC(CH_2)_n COOH$ reactant and the indicated amine;

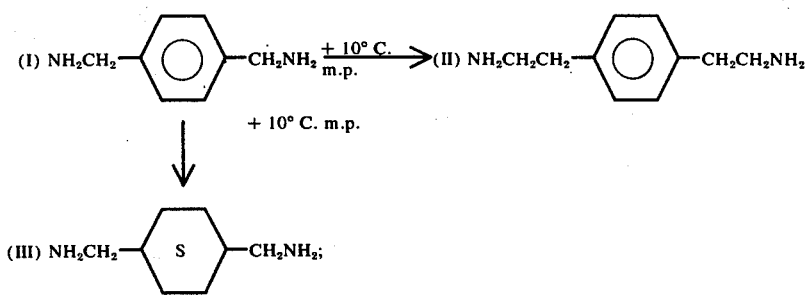

as used herein m.p.

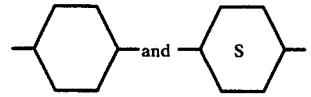

represent melting point, a benzene ring and a cyclohexane ring, respectively. From the diagram it is apparent that the corresponding polyamides embodied herein derived from

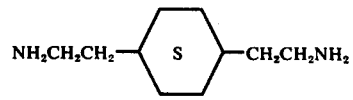

would be expected to have melting points 10° C. higher than the polyamides represented as (III) in the diagram. Unexpectedly, however, these polyamides have melting points 10° to 40° C. lower than the corresponding polyamides derived from trans-1,4-cyclohexanebis(methylamine). Polyamides derived from trans-1,4-cyclohexanebis(ethylamine) and $C_8$ to $C_{14}$ $\alpha.\omega$-aliphatic dicarboxylic acids are, by virtue of their lower melting points, readily spinnable into fibers having good properties, and in particular good dimensional stability.

DESCRIPTION OF THE PREFERRED EMBODIMENTS

Polyamides of the invention are characterized in that they contain repeating units of the structure

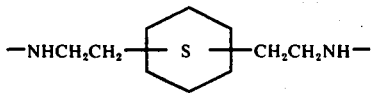

and preferably repeating units of the structure

wherein the polyamide is formed from polyamide-forming components having terminal amide-forming groups joined by a divalent hydrocarbon radical having at least 4 carbon atoms.

According to a preferred embodiment of the invention the polyamides consist of the condensation product of substantially equimolar proportions of a diamine reactant and a dicarboxylic acid reactant or an amide-forming derivative thereof, wherein a portion or all of the diamine reactant consists of tran-cyclohexanebis(ethylamine). As used herein, the term reactant has reference to a single compound of the type designated or a mixture of such compounds, e.g., diamine reactant includes a single diamine or a mixture of diamines. Suitable dicarboxylic acids for use in preparing the polyamides are those of the structure HOOC-R-COOH in which R is a hydrocarbon radical of at least 4 carbon atoms, for example, a hydrocarbon radical of from 4 to 20 carbon atoms. Representative R radicals include alkylene, phenylene, phenylenebis(alkyl), cyclohexylene, cyclohexylenebis(alkyl), naphthylene, anthrylene and the like. Preferably, R is a radical of the structure —$(CH_2)_n$—

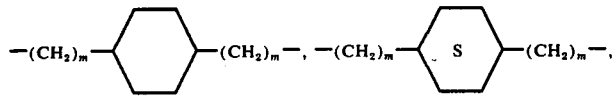

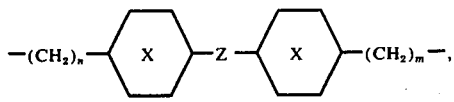

or a radical in which one or more of the hydrogen atoms of the above mentioned radicals are replaced by a $C_1$ to $C_4$ alkyl group, for example,

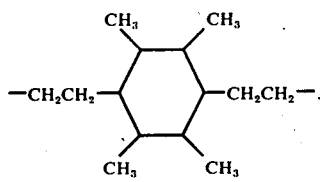

In the above radicals

represents a ring selected from a cyclohexane or a benzene ring, $n$ is a number of from 4–20, $m$ is a number of from 0–8 and Z is oxygen or a $(CH_2)_m$ radical. Suitable diamines for use in preparing the polyamides are those of the structure $NH_2$—R—$NH_2$, in which R has the same meaning as previously defined. The diamine reactant employed in preparing the polyamides should consist of at least 10 mole percent 1,4-cyclohexanebis(ethylamine) which may consist wholly of the trans or cis isomer or mixtures of the trans and cis isomer in which the trans isomer constitutes at least 50 mole percent of said mixture. Representative polyamides of this embodiment are polyamides of 1,4-cyclohexanebis(ethylamine) and HOOC-R-COOH, wherein R is a $(CH_2)_n$, for example, wherein n is 6, 8, 10 or 12.

In accordance with another embodiment of the invention the polyamides consist of the condensation product of an amino carboxylic acid reactant or an amide-forming derivative thereof and substantially equimolar proportions of a diamine and dicarboxylic reactant of the type described herein, characterized in that the diamine reactant consists of sufficient 1,4-cyclohexanebis(ethylamine) to provide a polyamide having a polymer chain in which at least 5 mole percent thereof is made up of

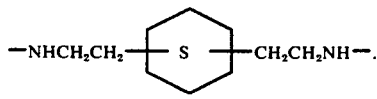

Thus, the mole ratio of amino carboxylic acid reactant to cyclohexanebis(ethylamine) may vary from 90:5 to 1:98. Suitable amino carboxylic acid reactants are of the structure

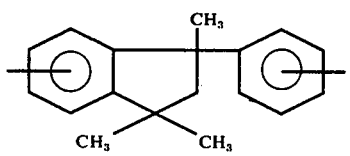

$NH_2$—$(CH_2)_n$—COOH and 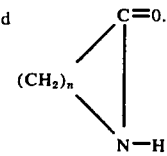

It is also contemplated that a portion or all of the 1,4-cyclohexanebis(ethylamine) component used in preparing the polyamides embodied herein may be replaced with an equivalent amount of a position isomer thereof, for example 1,3-cyclohexanebis(ethylamine).

The polyamides of this invention are prepared by procedures well known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4. Those compositions which are not suitable for textile fibers are useful for molding, coating or the like. The reaction can be conducted at superatmospheric, atmospheric or subatmospheric pressure. Often it is desirable, especially in the last stage of the reaction, to employ conditions, e.g., reduced pressure, which will aid in the removal of the reaction by-products. Preferably the reaction is carried out in the absence of oxygen, for example, in an atmosphere of nitrogen. The polyamides may, if desired, contain additives which are commonly incorporated into polymers, such as stabilizers, pigments, antistatic agents, plasticizers, additives to either increase or decrease the dyeability of the polyamide, delustrants, etc. Trans- and cis- cyclohexanebis(ethylamine) can be prepared according to art recognized techniques or may be obtained commercially.

To illustrate further the polyamides of the present invention the following examples are given. These examples are illustrative only and are not intended to limit the scope of the invention to the particular polyamides exemplified therein.

EXAMPLE 1

Equal molar amounts of trans-1,4-cyclohexanebis(ethylamine) and each of various $HOOC(CH_2)_nCOOH$ specified in Table 1 were reacted in water at about 50° C. to form aqueous solutions of the salt of trans-1,4-cyclohexanebis(ethylamine) and the respective acid. Each solution was concentrated by evaporation under a pressure of 13 p.s.i.g. until the temperature reached 136° C. The concentrated salt solution was then charged to a closed vessel and heated to remove water and effect polymerization. The pressure and temperature were then raised to about 250 p.s.i.g. and 220° C., respectively. The temperature was increased to about 243° C., while the pressure was held at 250 p.s.i.g. by removal of steam pressure. The pressure was then reduced to atmospheric over a 25-minute period. The temperature was adjusted to about 15° C. above the melting point of the polyamide and the polymer allowed to equilibrate for 30 minutes. The polymer was melt spun directly from the bottom of the autoclave to yield a monofilament yarn having good textile properties. The melting point, percent retention of sonic modulus at rising temperatures, and glass transition temperature of the polyamidefibers were determined and are given in the following Tables. The percent retention of the sonic modulus and glass transition temperature values of a fiber are excellent indications of its dimensional stability and are commonly used in the art for this purpose. In the Tables the following abbreviations are used:

CBEA-12 - polyamide of trans-1,4-cyclohexanebis(ethylamine) and dodecanedioic acid.

CBEA-10 - polyamide of trans-1,4-cyclohexanebis(ethylamine) and sebacic acid.

CBEA-9 - polyamide of trans-1,4-cyclohexanebis(ethylamine) and azelaic acid.

CBEA-8 - polyamide of trans-1,4-cyclohexanebis(ethylamine) and suberic acid.

CBEA-6 - polyamide of trans-1,4-cyclohexanebis(ethylamine) and adipic acid.

66 - nylon 66.

TABLE I-A

| Fiber Composition | Melting Point ° C. |
|---|---|
| CBEA-12 | 254 |
| CBEA-10 | 257 |
| CBEA-9 | 254 |
| CBEA-8 | 290 |
| CBEA-6 | 328 |
| 66 | 264 |

TABLE I-B

| Fiber Composition | % Sonic Modulus Retained at 0% Relative Humidity And At | | | | | |
|---|---|---|---|---|---|---|
| | 30° C. | 50° C. | 80° C. | 110° C. | 130° C. | 150° C. |
| CBEA-12 | 36.7 | 93 | 84 | 65 | 54 | 44 |
| CBEA-10 | 47.5 | 91 | 82 | 72 | 63 | 47 |
| CBEA-9 | 43.0 | 95 | 84 | 78 | 70 | 58 |
| Copolyamide of 1,4-cyclohexanebis(ethylamine) [75% trans, 25% cis] and adipic acid | 59.3 | 89 | 76 | 66 | 51 | 43 |
| Copolyamide of 1,4-cyclohexanebis(ethylamine) [66.7% trans, 33.3% cis] and adipic acid | 59.3 | 89 | 80 | 72 | 65 | 55 |
| 66 | 59.3 | 89 | 72 | 51 | 42 | 34 |

TABLE I-C

| Fiber Composition | % Sonic Modulus Retained At 30% Relative Humidity And At | | | | |
|---|---|---|---|---|---|
| | 30° C. | 45° C. | 60° C. | 75° C. | 90° C. |
| CBEA-12 | 37.4 | 91 | 87 | 82 | 71 |
| CBEA-10 | 51.5 | 88 | 83 | 76 | 69 |
| CBEA-9 | 43.0 | 91 | 84 | 76 | 69 |
| Copolyamide of 1,4-cyclohexanebis(ethylamine) [75% trans, 25% cis] and adipic acid | 57.5 | 85 | 73 | 70 | 65 |
| Copolyamide of 1,4-cyclohexanebis(ethylamine) [66.7% trans, 33.3% cis] and adipic acid | 59.3 | 89 | 80 | 72 | 66 |
| 66 | 60.8 | 87 | 73 | 63 | 51 |

TABLE I-D

| Fiber Composition | Glass Transition Temperature (Tg) | |
|---|---|---|
| | Tg At 0% Relative Humidity | Tg At 30% Relative Humidity |
| CBEA-12 | 135 | 120 |
| 66 | 115 | 90 |

EXAMPLE 2

In this example a copolymer fiber was prepared from a salt mixture of 40 mole percent hexamethylene diammonium adipate and 60 mole percent of a cis-trans mixture of 1,4-cyclohexanebis(ethyldiammonium) adipate according to the procedure of Example 1. The fibers had a melting point of 249° C., a tenacity of 6.13 grams per denier, an intrinsic viscosity of 1.12 and the following percent retention of sonic modulus at the indicated temperatures and relative humidities:

| % Sonic Modulus Retained At 0% Relative Humidity And At | | | | | |
|---|---|---|---|---|---|
| 30° C. | 50° C. | 80° C. | 110° C. | 130° C. | 150° C. |
| 48.9 | 93 | 84 | 65 | 54 | 44 |

| % Sonic Modulus Retained At 30% Relative Humidity And At | | | | |
|---|---|---|---|---|
| 30° C. | 45° C. | 60° C. | 75° C. | 90° C. |
| 48.9 | 83 | 75 | 67 | 59 |

Although the invention has been illustrated with reference to certain preferred embodiments thereof, other preferred embodiments include polyamides formed from substantially equimolar proportions of 1,4-trans-cyclohexanebis(ethylamine) or a mixture of 1,4-cis and 1,4-transcyclohexanebis(ethylamine) and one of the following acids: isophthalic, terephthalic, phenylindane dicarboxylic acid, 1,4-phenylendiacetic, 1,4-cyclohexane dicarboxylic acid, $\alpha,\alpha$-dimethyladipic, suberic and azelaic.

What is claimed is:

1. A fiber-forming polycarbonamide consisting essentially of the polymeric condensation product of a diacid of the formula HOOC-R-COOH and a mixture of diamines consisting essentially of 1,4-cyclohexanebis(ethylamine) and a diamine of the formula $NH_2$-R-$NH_2$ in a mole ratio of 3:2, respectively, wherein R represents the radical $-(CH_2)_n-$ in which $n$ is an integer from 4 to 20.

2. The polycarbonamide of claim 1, wherein the diacid is adipic acid and the diamine of the formula $NH_2$-R-$NH_2$ is hexamethylenediamine.

3. The polycarbonamide as defined in claims 1 in the form of a fiber.

* * * * *